United States Patent Office 3,752,883
Patented Aug. 14, 1973

3,752,883
PROCESS FOR THE PRODUCTION OF HYDROGEN
HALIDES FROM A BRINE
William Percy Moore, Jr., Chester, Va., assignor to Allied
Chemical Corporation, New York, N.Y.
Filed Apr. 1, 1971, Ser. No. 130,357
Int. Cl. C01b 7/08, 7/12
U.S. Cl. 423—481                                    3 Claims

ABSTRACT OF THE DISCLOSURE

A process for the production of hydrogen halides from halide brines containing bromides by treating the brine in a reactor containing a fluidized bed of particles maintained in a fluidized state by upward passage of gases at elevated temperatures producing halides, the gases being generated by burning a fluid fuel with oxygen or oxygen containing gas, and maintaining a reducing atmosphere in the brine treating zone to prevent formation of corrosive elemental bromine.

BACKGROUND OF THE INVENTION

This invention relates to a process for producing valuable hydrogen bromide from the hydrolysis of natural or synthetic brines and preventing formation of corrosive elemental bromine in the hydrolysis process. Invention relates particularly to hydrolysis of high chloride brines, containing a minor, but significant, amount of bromide salts, such as found in the Dead Sea. The invention is further particularly applicable to hydrolysis of brines which have had most of the alkali metal salts removed leaving primarily the alkaline earth (magnesium and calcium) chlorides and bromides.

It is well known that magnesium chloride and magnesium bromide can be thermally decomposed in the presence of excess water to form hydrochloric and hydrobromic acids. It is also known that calcium chlorides and bromides react in a similar manner but require more stringent reaction conditions. It is well known that anhydrous HCl or HBr or their aqueous mixtures at temperatures well above their dew point are rather non corrosive and are usually handled in mild steel containers and piping under these conditions. These gaseous vapors can be handled in steel or steel alloys at temperatures as high as 900° C. and higher without serious corrosion problems.

When the halide, particularly, the bromide, is oxidized to elemental halogen, corrosion of metal materials of construction is very severe. Such normally corrosion-resistant alloys as the Hastelloys and Inconels are severely attacked at moderate temperatures of, say, 500° C. by gases containing elemental bromine.

SUMMARY OF THE INVENTION

In accordance with the present invention, I provide a process for the production of hydrogen halides from halide brines, which eliminates the problem of corrosion by elemental halogens, particularly elemental bromine, comprising treating an aqueous solution comprising magnesium and calcium chlorides and bromides in a reactor containing a fluidized bed of particles containing silica sand, calcium silicate, magnesium oxide and other solid constituents, maintaining the particles in a fluidized state by upward passage of gases at elevated temperatures between 800–1300° C., preferably between 850–950° C. to effect reaction of the brine solids in the fluid bed, the aqueous magnesium chloride and bromide substantially converting to magnesium oxide and hydrogen chloride and hydrogen bromide, the aqueous calcium chloride and calcium bromide of the brine reacting with silica in the bed to form calcium silicate and hydrogen chloride and hydrogen bromide, withdrawing solids from the fluid bed for disposal, or for recovery of by-product values, releasing gaseous HBr, HCl, water vapor and combustion gases from the fluid bed for recovery or further reaction and maintaining a reducing atmosphere in the brine hydrolysis zone to prevent formation of corrosive elemental bromine. Surprisingly, small amounts of uncombined oxygen may be present in the effluent gases. This amount of oxygen must be severely limited and effluent gases must contain appreciable reducing gases such as hydrogen, carbon monoxide, sulfur, hydrogen sulfide or hydrocarbons.

To obtain optimum results, process conditions should be controlled within certain defined conditions to allow achievement of process with high yield and low corrosion. Operation with a high oxygen content in the effluent gas gives poor yield of desired hydrobromides and severe corrosion on the metallic materials of construction.

Optimum conditions for successful conversion of bromide salts in brine to hydrogen bromide without production of elemental bromine and without bromine corrosion of materials of construction are as follows:

|  | Operable range | Preferred |
|---|---|---|
| Fluid bed reaction temp., ° C | 800–1,300 | 850–950 |
| Water/halogen salt reactor feed ratio (mol) | 5–25/1 | 9–13 |
| Excess air in reactor exit gas—vol. percent $O_2$ | 0–4 | 0–2 |
| Atmosphere in reactor | (1) | (2) |

[1] Reducing atmosphere in bed.
[2] Presence of reducing substances such as cracked hydrocarbons, hydrogen, sulfur, $H_2S$, or reducing sulfur compounds, or carbon monoxide.

A reducing atmosphere in the brine hydrolysis zone to prevent formation of corrosive elemental bromine may be accomplished in various ways. Reducing gases such as hydrogen, carbon monoxide, hydrogen sulfide may be introduced into the hydrolysis zone or such reducing gases may be admixed with the fluid fuel burned to produce combustion gases for maintaining the solid particles in a fluidized state. Reducing gases such as carbon monoxide and hydrogen may be produced when burning hydrocarbon fuel by regulating the amount of oxygen so as to produce conditions which will result in partial thermo-cracking of the hydrocarbon fuel as well as incomplete combustion of the hydrogen fuel.

Brines used in carrying out the object of this invention can consist of aqueous alkaline earth halides such as pure magnesium bromide solution. A more general application is the use of a natural brine, or a partially processed natural brine, which contains primarily magnesium and calcium chlorides and bromides, with the bromide forming a relatively small but substantial part of the solids content of the brine.

When natural brines are used both hydrogen chloride and bromides are produced. The reaction conditions defined above prevent formation of substantial amounts of elemental bromine, low conversion of hydrogen bromide and corrosion by elemental bromine. As long as appreciable bromides are present in the brine feed, corrosion conditions will result since the corroding agent is principally elemental bromine unless the reaction conditions are carefully controlled to produce a reducing atmosphere in the brine hydrolysis zone in accordance with the present invention.

When a mixture of halides is produced from natural brines, the resulting aqueous hydrogen chloride and hydrogen bromide vapors may be used together. For example, both can be used simultaneously to acidulate phosphate rock to phosphoric acid. The hydrobromic acid or hydrochloric acids do not damage plastic materials of construction normally used in such acidulation plants, while wet elemental bromine will cause damage to these materials under acidulation reaction conditions.

Alternatively, hydrobromic acid is a valuable chemical commodity in itself, and can be recovered and separated from excess water, hydrochloric acid and other impurities by condensation followed by distillation fractionation.

DESCRIPTION OF THE DRAWINGS

The accompanying drawings diagrammatically illustrate one method of carrying out the operation of the present invention.

Figure 1:
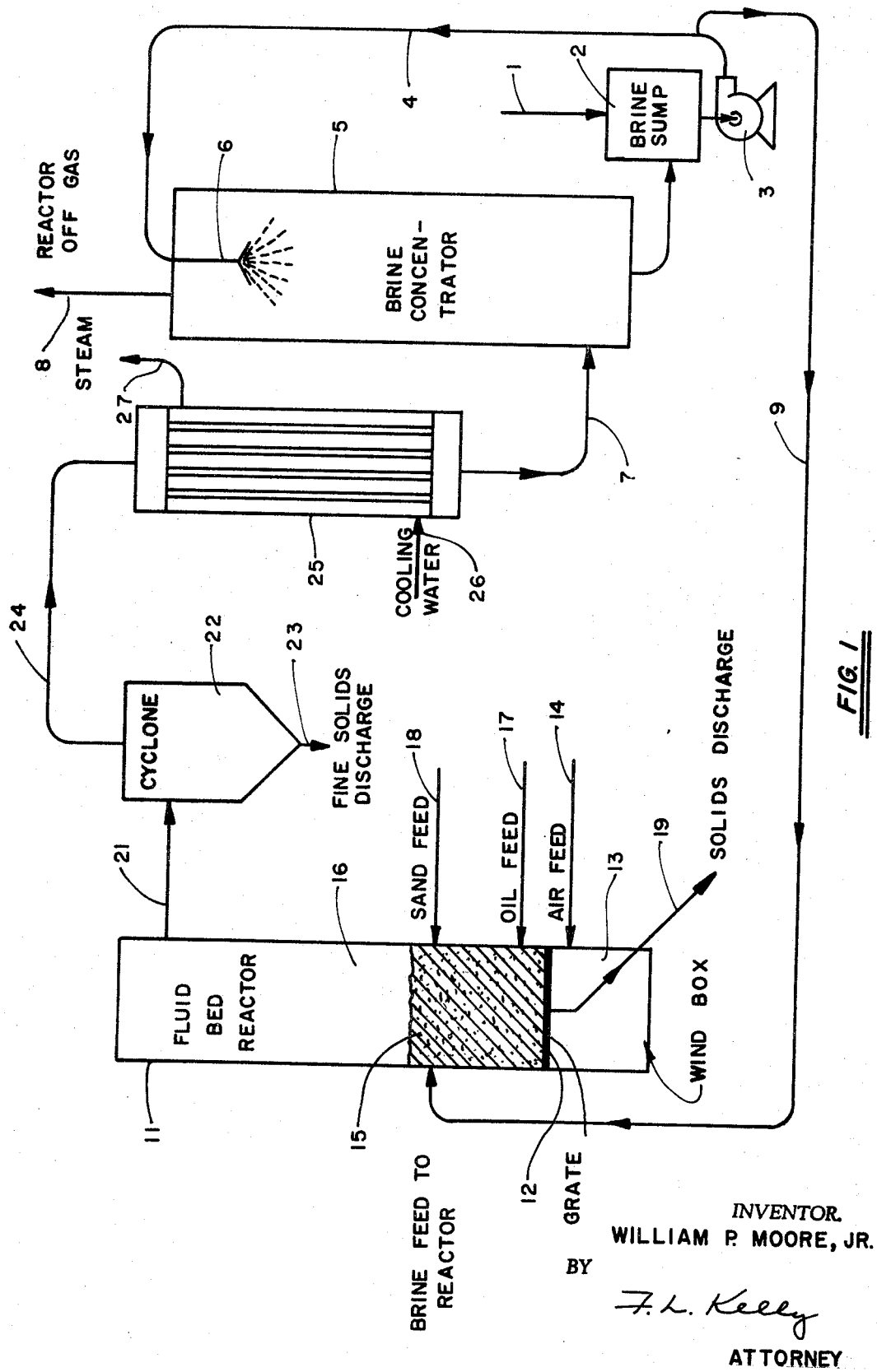
Referring to FIG. 1 of the drawings, brine feed is introduced into the system through line 1 into brine sump 2 from which it is directed by pump 3 through line 4 into the top of brine concentrator 5 which is an elongated vessel of conventional design equipped with a spray nozzle 6 through which the brine is dispersed. Hot gases enter through line 7 at a point near the bottom of brine concentrator 5 and pass upwardly countercurrent to the brine thereby effecting evaporation of some of the water in the brine. The gases containing evaporated water are released from the top of the brine concentrator 5 through line 8. A portion of the brine circulating from sump 2 to concentrator 5 is withdrawn from line 4 and directed through line 9 to fluid bed reactor 11. The fluid bed reactor is generally constructed of a vertically elongated steel vessel suitably lined with insulating brick. A horizontal grate 12 divides the vessel 11 into a lower wind box section 13 into which fluidizing air or gas is introduced through line 14 at a point below grate 12 and passes upwardly through the fluid bed of particles 15 located above grate 12. Above the dense phase of fluidized particles 15 is disengaging space 16 wherein the solid particles entrained in the rising gases are permitted to settle and drop down into the fluidized bed 15.

A fluid fuel such as oil or hydrocarbon gas is introduced through line 17 into the fluidized bed 15 at a point near its bottom. The uprising air passing through grate 12 burns the fuel generating heat to maintain the fluid bed within the temperature range of 800–1300° C. and also produces additional gases which assist in maintaining the solid particles in a fluidized condition. It is important to maintain a reducing atmosphere in the bed where the brine reacts to form hydrogen halide or else the hydrogen bromide will oxidize to elemental bromine corroding the metal equipment and resulting in loss of hydrogen bromide. This may be accomplished in various ways, such as reducing the amount of air thus effecting only partial combustion of the hydrocarbon fluid which will cause formation of carbon monoxide due to incomplete combustion and also thermocracking of the hydrocarbon fluid with concomitant formation of hydrogen. Reducing gas such as hydrogen sulfide, sulfur, gaseous hydrocarbons may be also introduced directly into the reaction zone in an amount sufficient to provide a reducing atmosphere. The amount of water to the halogen salt in the brine entering reactor 11 through line 9 should desirably at least be 5 mols water per mol of halogen salt and not more than about 25 mols per mol of halogen salt with preferably 9–13 mols water per mol halogen salt. Although it is preferred to operate under conditions where there is no free oxygen in the gases in the bed, small amounts of unreacted oxygen, i.e., less than 4% by volume, preferably less than 2%, may be tolerated providing there is a greater amount by volume of a reducing gas. The most desirable conditions are one wherein there is no uncombined oxygen in the effluent gas.

As the brine solids react in the fluid bed, the aqueous magnesium chloride and bromide substantially converts to HCl, magnesium oxide and hydrogen bromide, while the aqueous calcium chloride and calcium bromide of the brine reacts with the silica in the bed to form calcium silicate and hydrogen chloride and hydrogen bromide. Sand is introduced through line 18 into fluidized bed 15 to provide the silica for reaction with calcium chloride and calcium bromide of the brine. The solids are discharged from the fluid bed through line 19. The gaseous products in the disengaging zone 16 pass up to the top of vessel 11 and carry with them entrained fine particles of solids. The gaseous HBr, HCl, water vapor, combustion gases and entrained particles released from the top of the fluid bed reactor through line 21 enter cyclone 22 wherein the solid fine particles are separated from the gas and discharged from the bottom of cyclone 22 through line 23. The gases, substantially free from solid particles, flow from the top of cyclone 22 through line 24 down through gas cooler 25 wherein it is passed in indirect heat exchange with cooling water entering near the bottom through line 26 and discharging as steam from the top through line 27. The partially cooled gas leaving the gas cooler 25 through line 7 enters brine concentrator 5 to effect evaporation from the brine dispersing nozzle 6 at the top of brine concentrator 5.

Figure 2:
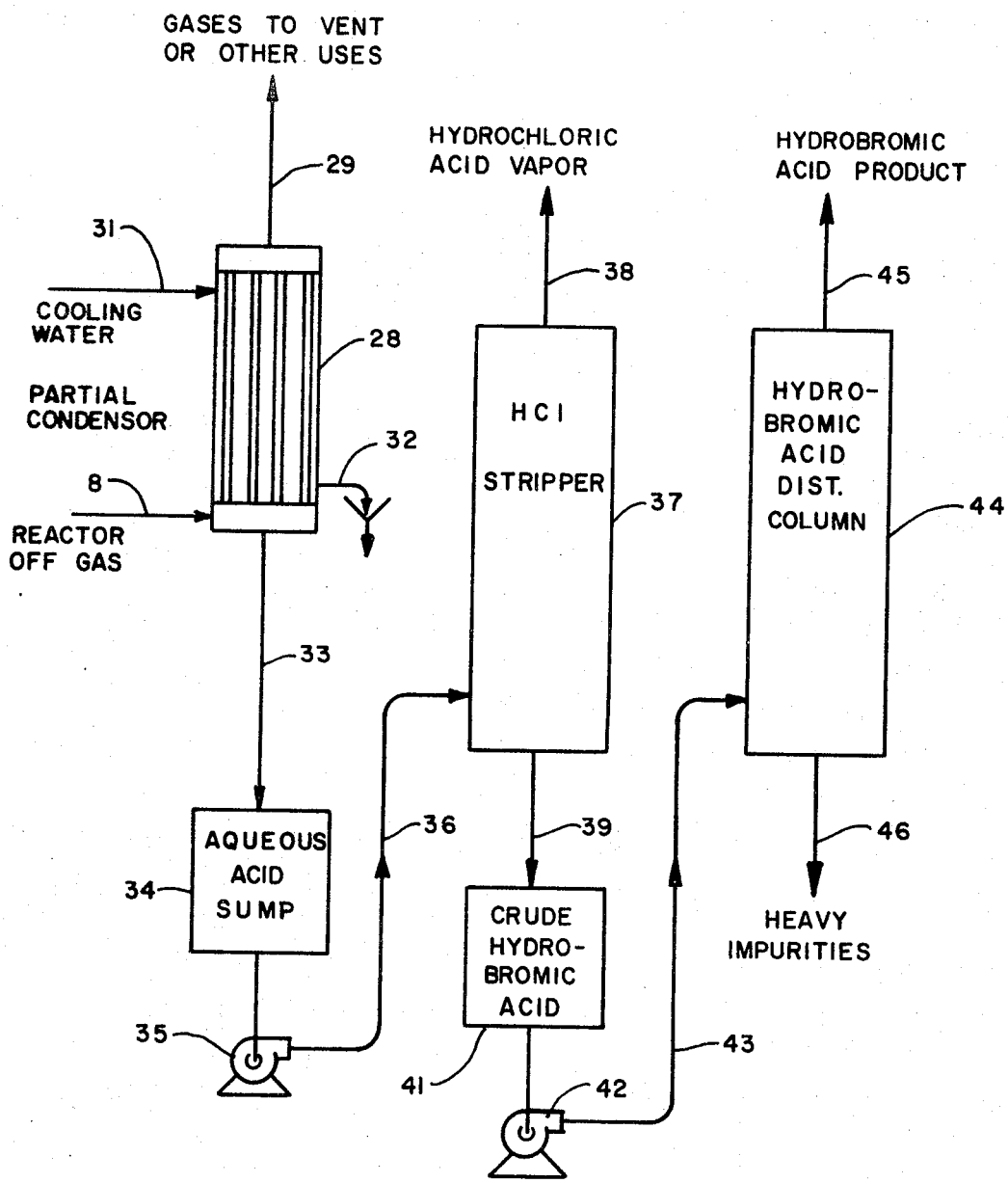

FIG. 2 illustrates one method of recovering hydrobromic acid contained in the reactor off-gases discharging from the top of brine concentrator 5 through line 8 in FIG. 1.

Referring to FIG. 2, the reaction off-gases composed of water vapor, combustion gases, HCl and HBr is subjected to cooling in a partial condenser 28 wherein a condensate consisting of an aqueous solution of hydrochloric and hydrobromic acid is formed and the non-condensable gases are vented through line 29. Cooling water entering through line 31 and discharging through line 32 passes in indirect heat exchange with the reactor off-gases. Liquid acid condensate discharging from partial condensor 28 through line 33 is collected in aqueous acid sump 34.

The liquid aqueous acid is forced by pump 35 through line 36 into HCl stripper 37 of conventional design wherein the hydrochloric acid is separated as a distillate and released as vapor through line 38. The bottoms of column 37 containing hydrobromic acid and other impurities are directed through line 39 into crude hydrobromic acid storage vessel 41. The crude hydrobromic acid is sent by pump 42 via line 43 to another fractionating column 44 wherein the purified hydrobromic acid is vaporized and released as a product through line 45. The heavy impurities collecting in the bottom of column 44 are discharged through line 46 and discarded.

The following examples illustrate the present invention.

Example 1

Fluid bed reactor consisted primarily of a vertical steel pipe 36 inches in diameter and 20 feet tall. Reactor was lined with a layer of insulating brick next to the steel shell and an inner layer of fire brick. Thus, the actual internal diameter of the fluid bed reactor was 18 inches. The reactor contained a wind box where preheated air was fed below a grate. The grate separated the fluidized section of the reactor from the wind box and constructed with type 316 stainless steel. The grate contained five nozzles to allow the fluidizing air to enter the reaction zone. The nozzles consisted of ½ inch Hastelloy D pipe 2 inches high. Across the open top of the nozzle was tack-welded a split piece of ½ Hastelloy D pipe to deflect the entering air and to prevent solids from the fluid bed from going down into the wind box. The grate floor was covered with a 1 inch layer of refractory cement. The fluidizing nozzles were not covered with refractory but were bare.

After operating the system as shown in FIG. 1 for 80 hours continuously to assure system equilibration and steady state conditions, the following test data were taken. Amounts given are pounds per hour and are average figures for the 93-hour test period used.

Referring to FIG. 1, brine was fed through line 1 into the sump of the Brine Concentrator at a rate of 86.3 pounds per hour. Feed of the individual components was as follows:

| Component: | Lbs./hr. |
|---|---|
| Calcium | 6.74 |
| Magnesium | 0.75 |
| Chloride | 14.81 |
| Fluoride | 0.12 |
| Bromide | 0.14 |
| Aluminum | 0.04 |
| Iron | 0.06 |
| Sodium | 0.32 |
| Potassium | 0.07 |
| Phosphorous | 0.12 |
| Water | 63.14 |
| Total | 86.31 |

Some of the water was evaporated from the feed brine by hot fluid bed reactor effluent gases, and the brine was then continuously pumped into the fluid bed reactor. The brine feed was introduced about at the top of the dense phase in the fluid bed reactor. The dense phase extended about four feet above the grate, with the remainder of the fluid bed reactor consisting of disengaging space for separating effluent gases and solids.

Preheated air was introduced at 449.5 pounds per hour, at about 450° C., through line 14 and through the grate and nozzles to the fluid bed. Bunker "C" heavy fuel oil was continuously preheated to 150° C. and introduced into the fluid bed through line 17 at a point about 12 inches above the reactor grate. The key components of the fuel oil were fed at rates as follows:

| Component: | Lbs./hr. |
|---|---|
| Sulfur | 0.48 |
| Carbon and hydrogen | 23.00 |
| Other (by diff.) | 0.52 |
| Total | 24.00 |

Silica sand was continuously fed through line 18 at a rate of 34.5 pounds per hour near the top of the dense phase of the fluid bed reactor.

Reactor temperature stabilized evenly throughout reactor during the test period at about 850° C. The fuel containing sulfur, hydrogen and carbon dispersed very quickly and smoothly onto the particles of the fluid bed and combustion of this fuel with the air introduced through the gas phase occurred smoothly in a reducing atmosphere, with excess reducing agent at the combustion site. Intimate contact of the sand with the calcium chloride, calcium bromide and water at this reaction site allowed rapid reaction to form hydrogen chloride and hydrogen bromide and calcium silicate and the intimate contact of water with magnesium bromide and chloride allowed rapid reaction to hydrogen bromide and hydrogen chloride and magnesium oxide.

The solid product was withdrawn from the reactor continuously through the center of the grate and the line 19 for disposal or for recovery of by-product value. Rate of withdrawal of components was as follows:

| Component: | Lbs./hr. |
|---|---|
| Calcium | 5.79 |
| Magnesium | 0.67 |
| Chloride | 1.00 |
| Fluoride | 0.03 |
| Bromide | <0.01 |
| Aluminum | 0.03 |
| Iron | 0.03 |
| Sodium | 0.11 |
| Potassium | 0.02 |
| Phosphorous | 0.09 |
| Sulfur | 0.34 |
| Other (mainly silica) | 29.88 |
| Total | 38.00 |

Attrition of calcium silicate, magnesia, silica and other particles in the bed occurred continuously allowing fresh reaction surfaces and producing some fines, some of which were carried out of the main fluid bed reactor through ducts to the fines cyclone. These fines were removed from the hot gas stream by the cyclone and withdrawn through line 23. Fines solids were withdrawn at rates as follows:

| Component: | Lbs./hr. |
|---|---|
| Calcium | 0.94 |
| Magnesium | 0.14 |
| Chloride | 0.24 |
| Fluoride | 0.01 |
| Bromide | <0.01 |
| Aluminum | 0.01 |
| Iron | 0.01 |
| Sodium | 0.04 |
| Potassium | <0.01 |
| Phosphorous | 0.02 |
| Sulfur | 0.11 |
| Other (mainly silica) | 7.39 |
| Total | 8.91 |

Gaseous products of reaction were removed through the cyclone and ducts and a tube and shell heat exchanger. The heat exchanger was constructed with Inconel tubes and by vaporizing high pressure steam on the shell side very quickly reduced the temperature of the effluent gases from about 840° C. to about 450° C. The gases were then immediately quenched to about 108° C. by direct contact with a spray of the incoming brine in the Brine Concentrator. The gases were discharged for recovery of hydrobromic acid and hydrochloric acid or for direct use, as in the acidulation of phosphate rock, or for venting, through line 8. The rate of production of the components was as follows:

| Component: | Lbs./hr. |
|---|---|
| Chloride | 13.57 |
| Fluoride | 0.08 |
| Bromide | 0.14 |
| Iron | 0.02 |
| Sulfur | 0.03 |
| Water | 75.06 |
| $CO_2$ | 41.36 |
| Oxygen | 19.58 |
| Nitrogen | 344.79 |
| Elemental bromine, nil. | |
| Elemental chlorine, nil. | |
| Others (including carbon monoxide, hydrocarbons, etc.) | 52.21 |
| Total | 546.84 |

Thus, the bromides in the brine feed to the fluid bed system were recovered about quantitatively as HBr in the gases leaving the fluid bed system. Conversion of the chlorides was not as complete, but was over 90%. No elemental bromine or chlorine could be detected in either the effluent gases or solids from the fluid bed reactor system.

Inspection of the Hastelloy nozzles in the grate and the Inconel heat exchanger on the effluent gases, on completion of the test showed no appreciable corrosion. Separate tests on these metals where elemental bromine was introduced showed severe attack under similar conditions.

Example 2

The valuable hydrobromic acid produced in the fluid bed reaction system, line 8 was recovered in good efficiency by partial condensation and distillation as shown on FIG. 2.

The effluent gases were cooled in a partial condenser which was constructed of Karbate tubes with water cooling on the shell side. The condensate from this operation was discharged through line 33 to the Aqueous Acid Sump at 65° C. at a component rate as follows:

| Component: | Lbs./hr. |
|---|---|
| HBr | 0.13 |
| HCl | 4.25 |
| H$_2$O | 21.50 |
| Other | 0.10 |
| Total | 25.98 |

The remaining gases and uncondensed vapors were discharged through line 29 for subsequent use, recovery, or venting.

The liquid crude aqueous hydrochloric and hydrobromic acids were fed from the Aqueous Acid Sump to the HCl Stripper Column. In this column aqueous hydrochloric acid was taken as distillate for direct use or recovery through line 38 and an aqueous crude hydrobromic acid was discharged from the bottom of this column through line 39 and fed to the Hydrobromic Acid Distillation Column. The heavy impurities were withdrawn from the bottom of this column through line 46 and the aqueous hydrobromic acid azeotrope was withdrawn as distillate from this column operating at 900 mm. Hg absolute pressure at the following component rates:

| Component: | Lbs./hr. |
|---|---|
| HCl, trace. | |
| HBr | 0.13 |
| Water | 0.14 |
| Total | 0.27 |

Thus, hydrobromic acid suitable for commercial use was recovered from bromide bearing brines in near quantitative yields.

The foregoing examples are merely illustrative of the application of the principles of the invention. It will be apparent to those skilled in the art that numerous modifications may be made therein without departure from the spirit of the invention or the scope of the appended claims.

I claim:
1. A process for the production of hydrogen halides from a halide brine containing alkaline earth chlorides and bromides and 5 to 25 mols of water per mol of halide, comprising treating said brine in a reactor containing a fluidized bed of particles containing silica maintained in a fluidized state and at a temperature of 800 to 1300° C., by upward passage of gases at elevated temperatures, thereby producing hydrogen halides, said gases being generated by burning a hydrocarbon fuel with oxygen or an oxygen-containing gas and maintaining a reducing atmosphere in the brine treating zone to prevent formation of corrosive elemental bromine, said reducing atmosphere in said brine treating zone being maintained by limiting the amount of said oxygen or oxygen-containing gas during said burning of said hydrocarbon fuel so that incomplete combustion of the hydrocarbon fuel is accomplished, thereby producing said reducing atmosphere.

2. A process according to claim 1 wherein the hydrocarbon fuel is a normally liquid or gaseous hydrocarbon.

3. A process according to claim 1 wherein said fluidized bed is maintained at a temperature of 850-950° C.

References Cited
UNITED STATES PATENTS

| 1,379,731 | 5/1921 | Theimer | 23—154 |
| 1,853,330 | 4/1932 | Barstow et al. | 23—154 X |
| 1,892,652 | 12/1932 | Heath | 23—154 |
| 2,163,877 | 6/1939 | Hooker | 23—216 |
| 2,726,142 | 12/1955 | Reeve | 23—154 |
| 2,825,627 | 3/1958 | Redniss et al. | 23—154 |
| 3,084,028 | 4/1963 | Foulletier et al. | 23—216 |
| 3,145,079 | 8/1964 | Harbaugh | 23—154 |
| 3,482,933 | 12/1969 | Moore et al. | 23—154 X |
| 3,594,124 | 7/1971 | De Beni | 23—154 |

FOREIGN PATENTS

| 820,093 | 9/1959 | Great Britain | 23—154 |

EDWARD STERN, Primary Examiner

U.S. Cl. X.R.
423—488

PO-1050
(5/69)

UNITED STATES PATENT OFFICE
CERTIFICATE OF CORRECTION

Patent No. 3,752,883          Dated August 14, 1973

Inventor(s) William P. Moore, Jr.

It is certified that error appears in the above-identified patent and that said Letters Patent are hereby corrected as shown below:

Column 2, line 48, "hydrogen" should be --hydrocarbon--.

Signed and sealed this 18th day of December 1973.

(SEAL)
Attest:

EDWARD M. FLETCHER, JR.      RENE D. TEGTMEYER
Attesting Officer              Acting Commissioner of Patents